United States Patent [19]
Leavitt

[11] Patent Number: 5,197,037
[45] Date of Patent: Mar. 23, 1993

[54] METHOD AND APPARATUS FOR THE SIMULTANEOUS PERFORMANCE OF THE BEAM FORMATION AND SCAN CONVERSION IN A PHASED ARRAY SYSTEM

[75] Inventor: Steven C. Leavitt, Hampstead, N.H.

[73] Assignee: Hewlett-Packard Company, Palo Alto, Calif.

[21] Appl. No.: 785,669

[22] Filed: Oct. 31, 1991

[51] Int. Cl.$^5$ .................. G01N 29/04; G03B 42/06
[52] U.S. Cl. .................. 367/11; 73/625; 128/661.01
[58] Field of Search .......... 367/11, 105; 73/625, 73/626; 128/661.01, 661.02

[56] References Cited

U.S. PATENT DOCUMENTS

| | | | |
|---|---|---|---|
| 4,468,747 | 8/1984 | Leavitt et al. | 364/577 |
| 4,471,449 | 9/1984 | Leavitt et al. | 364/577 |
| 4,817,434 | 4/1989 | Anderson | 73/625 |

*Primary Examiner*—Daniel T. Pihulic

[57] ABSTRACT

A method and apparatus are provided for utilizing a digital front end in a phased array system such as an ultrasonic scanning system to simultaneously perform both digital beam formation and scan conversion. Echo signals from each of the N channels of the array aperture are sampled at selected points along returning echo signals. The samples are preferably used to determine a value for each channel for each pixel utilized in the display by, for example, determining a transmit time for such point. The values for each pixel for the N channels are then summed to obtain the value for the pixel. Alternatively, the samples may be taken at uniform intervals along each channel line and the sample values interpolated to obtain values at Y-boundary crossings or sampling may be taken at times determined so that each sample is at a Y-boundary crossing. The Y-boundary crossing sample values are stored and are then summed to obtain coherently enhanced sample values at the crossings. The sample values at the Y-boundary crossings may then be interpolated or otherwise utilized to obtain sample values for display pixels.

24 Claims, 8 Drawing Sheets

METHOD AND APPARATUS FOR THE SIMULTANEOUS PERFORMANCE OF THE BEAM FORMATION AND SCAN CONVERSION IN A PHASED ARRAY SYSTEM

FIELD OF THE INVENTION

This invention relates to phased array ultrasonic scanning systems and, more particularly, to an improved front end for such systems which is operative to simultaneously perform digital beam formation and scan conversion.

BACKGROUND OF THE INVENTION

In a phased array system such as that used for ultrasonically performing diagnostic procedures, the paths from a point being scanned to the various transducers of the scan aperture are of different lengths, resulting in echoes from the point being received at the transducers at different times. In conventional systems of this type, such as the HP SONOS 1000 ultrasound system from Hewlett-Packard, analog techniques, such as mixers and delay lines, are utilized to compensate for these different path lengths, so that when the outputs from the various transducers are summed, the summed values are for the same scan point. This process is referred to as beam formation.

However, once the beam is formed, the information represents analog data along either straight or radial lines. The samples along these lines bear no relationship to the locations of pixels on a cathode ray tube screen where the scanned image is normally to be displayed. Thus, the analog beam formed data is typically sampled and applied to a digital scan converter to map this information into a frame buffer for controlling image display. Systems for performing such scan conversion operations are described, for example, in U.S. Pat. Nos. 4,468,747 and 4,471,449, both filed in the name of Steven C. Leavitt et al and assigned to the assignee of the instant application.

However, while such systems provide good results, there are a number of reasons why a fully digital front end is preferable to the partially analog and partially digital systems currently employed. First, the elimination of costly analog delay elements reduces the overall cost of the system. Second, a fully digital system is more flexible and thus adapted to provide higher degrees of accuracy. For example, the compensation required for beam formations varies as a function of scan depth. With tapped delay lines, it is difficult to achieve required delay variations. Many systems merely switch delays at some depth or depths, resulting in discontinuities in the output. More sophisticated systems can still only approximate continuous delay variations. A digital front end would provide the flexibility required to provide substantially continuous depth compensation in beam formation. Third, a fully digital system is less prone to error. A digital system may also process multiple received lines from a single transmit, something which is not possible without using two or more costly analog delay lines.

Further, there are currently some redundancies in the operation which results in analog beam formation and in the operation for doing digital scan conversion. Thus, with a fully digital front end, both complexity and cost can be further reduced by combining these operations into a single operation which compensates for the difference in scan line lengths for beam formation at the same time that the scanned image is being converted to provide image values at the pixel locations to control the display.

SUMMARY OF THE INVENTION

It is therefore a primary object of this invention to provide an improved technique for operating a phased array system and, in particular, to provide a fully digital front end for such a system which is adapted to perform both beam formation and scan conversion as a single operation.

More particularly, this invention provides a method and apparatus for performing digital front end operations in a phased array system. Echo signals from each of the N channels of the array which are being utilized to perform a scan are sampled at selected points along the returning echo signals. Such sampling occurs for each scan line of a display frame. The samples at the selected points are utilized to store values for the N channels at points related in a predetermined way to pixel locations. The values for the N channels at each point are then summed to obtain a sample value for the point and the sample values for the points are utilized to store sample values for each pixel.

For a preferred embodiment of the invention, sample values are utilized to determine a value for each channel for each pixel utilized in the display and the values for each pixel for the N channels are summed to obtain the value for the pixel. More particularly, for this embodiment, pixel points $p_m$ are selected in a predetermined sequence for pixel points related in a predetermined way to a given scan line. A transit time T for each channel is then determined for each point $p_m$. Samples for a channel at times straddling the time T are then utilized to determine the sample for the corresponding point $p_m$ for the channel and the values for each point $p_m$ for the N channels are summed. The summed output for each point $p_m$ is utilized as the value for the corresponding pixel. For this preferred embodiment, transit time is determined by determining for each channel the transmit path length $d_t$ for the scan line at angle $\theta$ to point $p_m$ and the return path length $d_m$ for a reflection from the point $p_m$ to the element for channel N. $d_t$ and $d_m$ are then utilized to determine total transit time T in accordance with the relationship $T=(d_t+d_m)$, where "vel" is the velocity at which sound propagates within the each scan line $\theta$ are the pixel points falling within a wedge-shaped section between lines extending at an angle spaced by $\Delta\theta/2$ on each side of the transmitted scan line, where $\Delta\theta$ is the spacing between successive transmit scan lines.

The front end preferably includes a dual memory buffer DMB having N channels on each of its ports. Samples for each channel for a scan line at an angle $\theta$ are stored in corresponding channels on one port of the DMB, the port of the DMB on which samples are stored being toggled for successive scan lines. Samples from a preceding scan on one port of the DMB are utilized to determine transit time, while new samples from the current scan at angle $\theta$ are stored on the opposite port of the DMB.

For other embodiments of the invention, the selected sample points are utilized to store values for the N channels at a first set of boundary crossings for the matrix display. The first set of boundary crossings may, for example, be the Y-boundary crossings. The values for the N channels at each of the first boundary crossings are then summed to obtain a sample value at the crossing. The sample values at the first set of boundary crossings for the scan lines are then interpolated or otherwise utilized to obtain sample values for display pixels at the junctions of first and second boundaries of a display matrix grid, the pixels being located at such junctions.

For one of these embodiments of the invention, the signals are sampled for each channel at M substantially uniformly-spaced points along each signal, and at least the two samples closest on either side of each first boundary crossing are interpolated for each channel to obtain the value for the boundary crossing for the channel. These are the Y-boundary crossing values which are stored. For another embodiment of the invention, the sampling occurs at the first boundary crossings for each channel.

For all embodiments of the invention, real and imaginary samples are obtained, utilized for interpolation if necessary, stored and separately summed.

The foregoing and other objects, features and advantages of the invention will be apparent from the following more particular description of preferred embodiments of the invention as illustrated in the accompanying drawings.

IN THE DRAWINGS

DETAILED DESCRIPTION

Figure 2A:
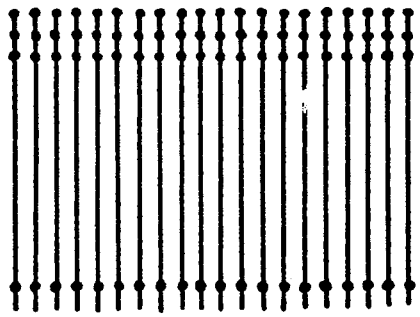
FIGS. 2A and 2B illustrate the two different types of display formats, FIG. 2A illustrating a linear display format and FIG. 2B a sector formatted display.
Figure 2B:
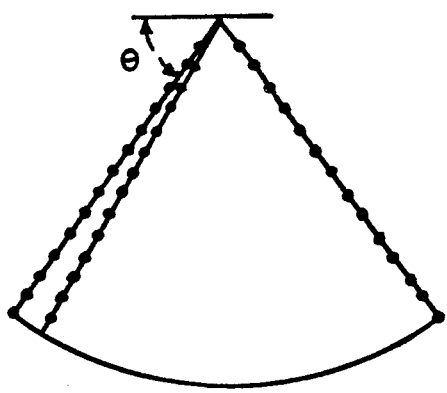

FIGS. 2A and 2B illustrate the two different scan and display formats which are generally utilized. With a linear scan as shown in FIG. 2A, the scan lines are parallel and generally orthogonal to the plane of the linear array. The spacing of the scan lines is, however, not necessarily directly related to the spacing of the transducer array elements. Further, even though a given line may be generally orthogonal to a particular transducer element, it is not orthogonal to the other elements forming the scan aperture. Therefore, the unequal time for receipt of echoes from a given point being scanned still exists, and beam forming is still required. However, once beam forming has been completed, the sample values are generally in an X-Y coordinate system and scan conversion is a relatively simple interpolation process.

By contrast, with a sector format such as that shown in FIG. 2B, and utilizing conventional analog beam forming information is received in a polar format which must then be converted to X-Y format for display. With a sector format, each scan line is projected at an angle $\theta$ to the plane of the array. $\theta$ might typically cover $\pm 45°$ in $\frac{3}{4}°$ steps. Angular sampling could be at a rate satisfying Nyquist limits. This might result in 121 scan lines, each containing approximately 400 sample points after analog beam formation and digital sampling, which must then be converted to the X-Y grid coordinates, with a pixel appearing at each X-Y junction. A typical display might have 512×512 lines.

Since the method and apparatus for combining beam formation and scan conversion into a single operation in a digital front end are substantially the same whether a linear format or a sector format is utilized, and since the operation with a sector format is more complicated, the following discussion will be with respect to a sector formatted system. However, it should be understood that what is being said for a sector formatted system will apply equally with respect to a linear format or any other arbitrary display format.

As was indicated above, in one conventional system, beam formation is done utilizing mixers and analog delay lines. Because of the tapped nature of such delay lines, maintaining continuous control with increasing depth is not possible, and complex techniques have been evolved to approximate such control. Once beam formation has been achieved, scan conversion can be effected either by sampling the beam formed signals at a uniform rate and interpolating to obtain Y boundary crossings or by sampling the beam formed analog signals at determined Y-boundary crossings. More elaborate techniques may also be utilized such as those taught in beforementioned U.S. Pat. No. 4,471,449. The Y-boundary crossing values can then be interpolated to obtain X-boundary crossings.

Figure 1:
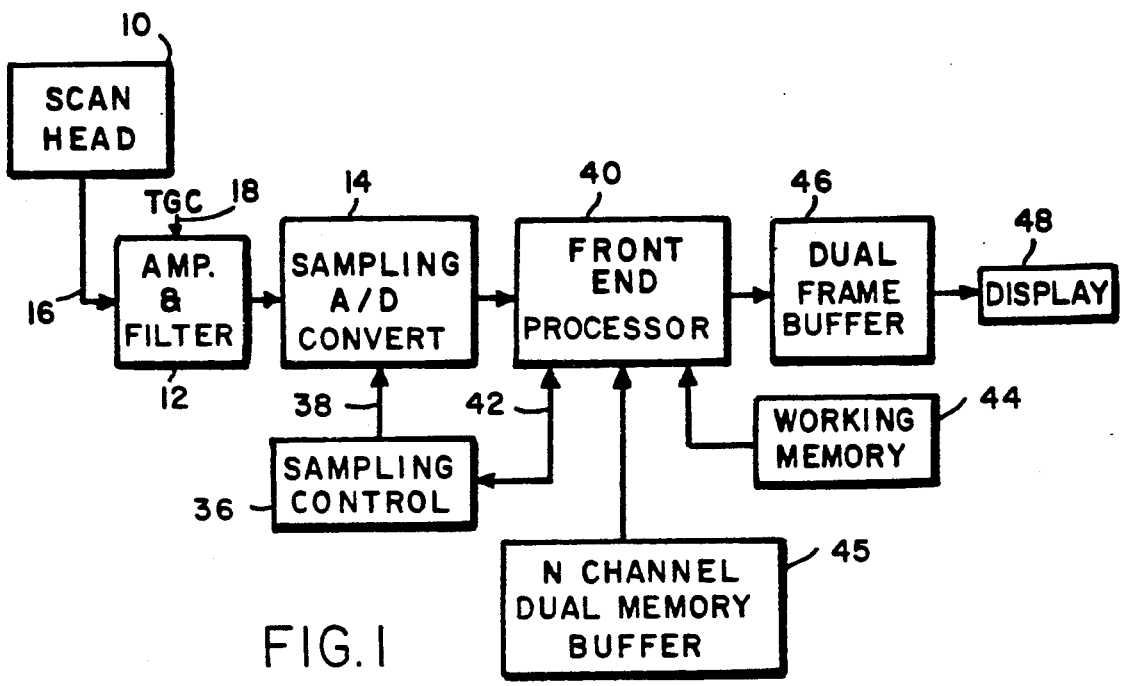
FIG. 1 is a schematic block diagram of a system in which the teachings of this invention might be utilized.

FIG. 1 illustrates a system which utilizes the improved techniques of this invention to perform the two separate steps indicated above, beam formation and scan conversion, as a single operation. Referring to this figure, echo signals received by individual transducer elements of scan head 10 are applied through standard preprocessing circuits 12 to sampling A/D converters 14. A typical scan head 10 might have 128 transducer elements. The scan aperture, and thus the number of scan channels N, might include all of the transducer elements or some selected subset thereof. There will thus be at least N output lines 16 from scan head 10, N circuits 12 and N sampling A/D converter circuits 14; however, converters could be shared for multiple channels in order to reduce converter cost.

Circuits 12 may include standard amplification and filtering circuits to process the echo signals. A time gain control signal 18 may be applied to at least one of the amplifiers in each channel to maintain a substantially constant gain regardless of scan depth.

The sampling A/D converters 14 for each channel could sample both real and imaginary values. A variety of A/D converter circuits known in the art may be utilized for achieving the required quadrature signals. Such techniques include, but are not limited to, mixers, continuous phase shift, all pass filters, or quadrature sampling. Whichever technique is utilized, there is a real and imaginary output from converters 14 for each channel. Alternatively, only real samples could be taken by A/D converters 14 and this circuit could be followed by a complex fast Fourier transform circuit, filtering and inverse fast Fourier transform to achieve both real and imaginary values. This operation is known in the art as a Hilbert transform. Throughout the following discussion, it is assumed this is the method used to derive both real and imaginary samples from real samples.

The clocks utilized to control A/D converters 14 would typically be at a uniform frequency, uniform sampling being the most straightforward and the preferred sampling technique; however, as illustrated later, a non-uniform sampling scheme could be utilized for certain embodiments. A sampling control circuit 36 is provided to generate clocks and other required controls on lines 38 to converters 14. The controls would normally be the same for all channels, but this is not a limitation on the invention.

The outputs from the sampling A/D converters 14 are applied to front end processor 40. All or a selected portion of processor 40 may be special purpose circuits designed to perform one or more of the various functions required to practice the teachings of this invention. The processor may also be or include, as appropriate, general purpose microprocessors or minicomputers programmed to perform these functions or may be the processor utilized for or with the ultrasonic phased array system, which processor is also programmed to perform the front end function. The functions performed by processor 40 will be discussed in greater detail later. Processor 40 may also provide synchronization and other controls to sampling control circuit 36 through lines 42 and may receive information or controls from control 36 through lines 42. A memory 44 is provided with processor 40 in which samples and preliminary boundary crossing values may be stored until all required calculations have been completed. For the preferred embodiment, an N channel dual memory buffer 45 is also provided.

An output from processor 40 is applied to dual frame buffer 46 which stores the pixel value for each pixel to be displayed on display 48. Buffer 46 is preferably a dual frame buffer, permitting an output frame to be displayed while a new frame is being formed, and thus eliminating old/new boundary artifacts which would otherwise be present. Buffer 46 is scanned in known fashion in conjunction with the raster scan of display 48 to control image intensity and/or color at each scan pixel location on the display.

Figure 3A:
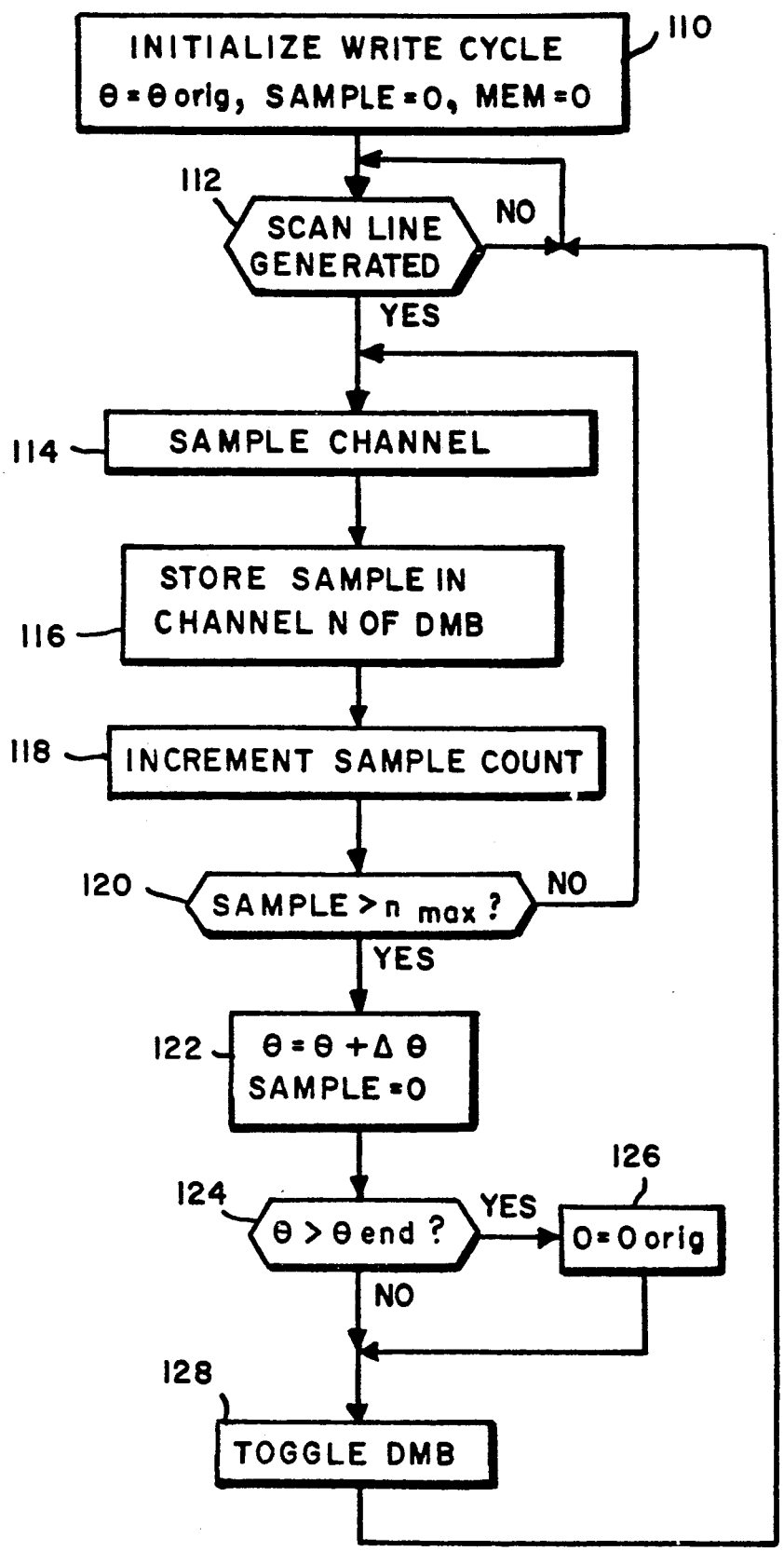
FIG. 3A is a flow diagram of the sequence of operations for storing samples for a preferred embodiment of the invention.
Figure 3B:
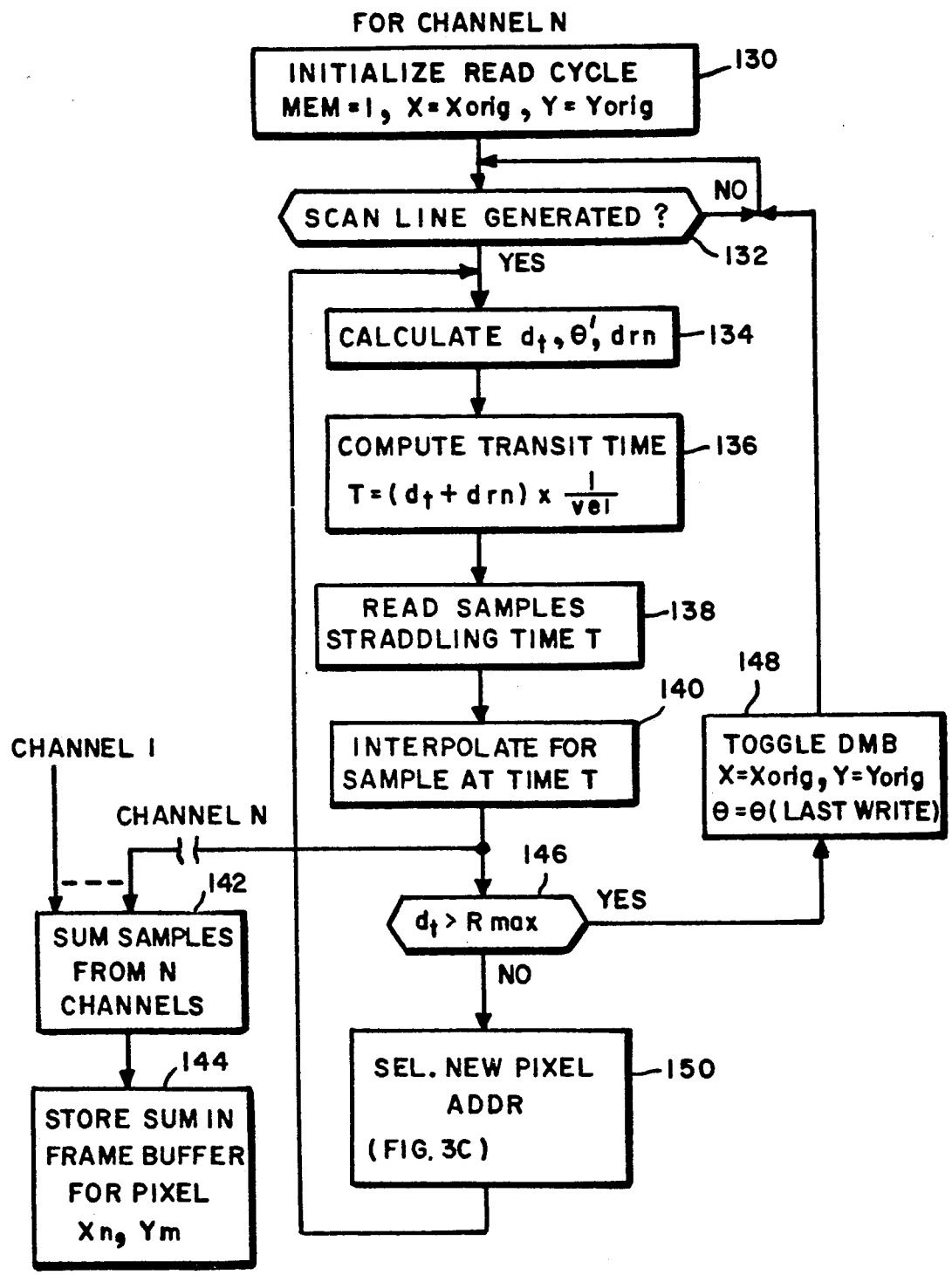
FIG. 3B is a flow diagram of the sequence of operations for utilizing the samples stored in the operation of FIG. 3A to perform beam formation/scan conversion for the preferred embodiment.
Figure 3C:
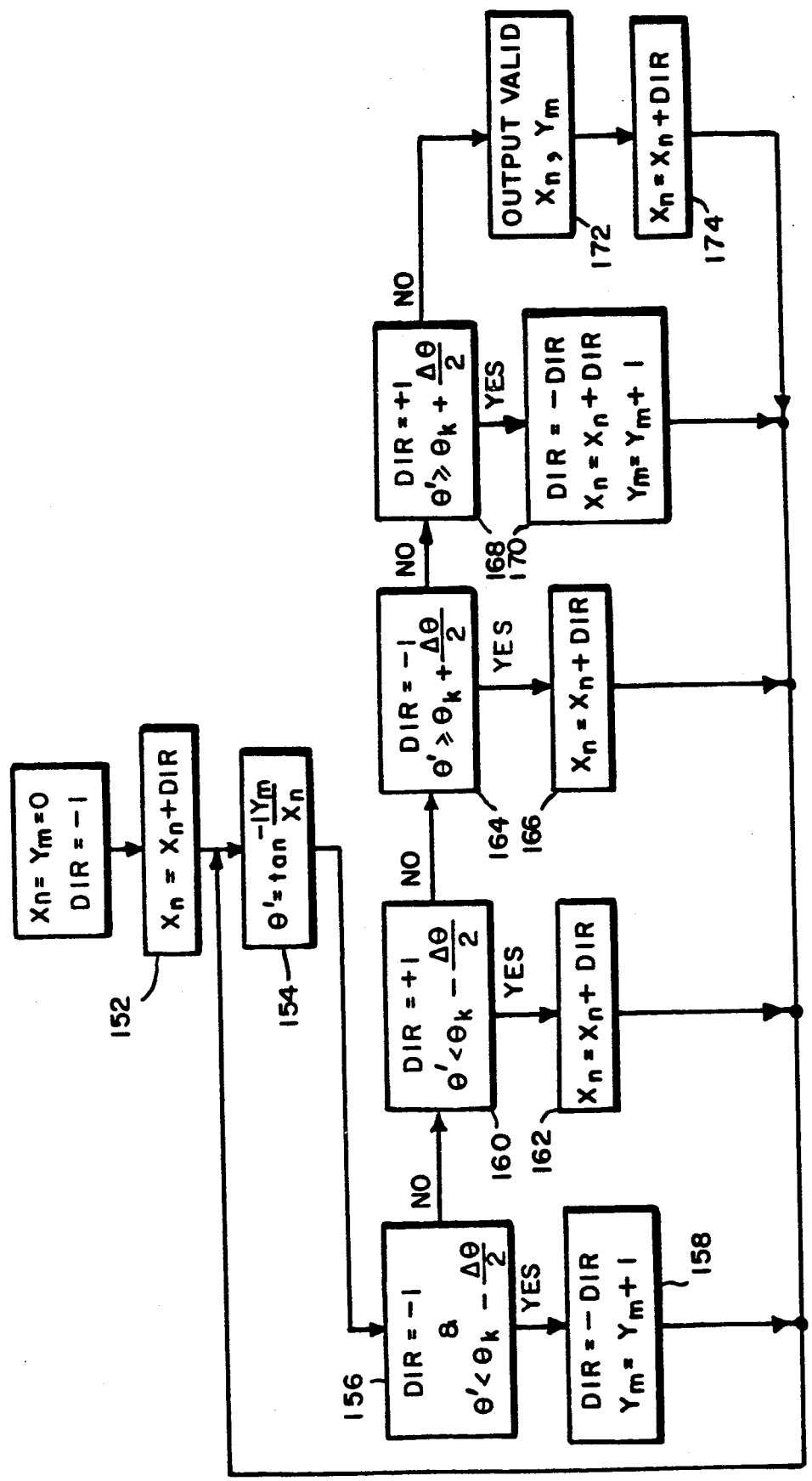
FIG. 3C is a flow diagram of the sequence of operation for performing the select new pixel address step of FIG. 3B for a preferred embodiment.
Figure 4B:
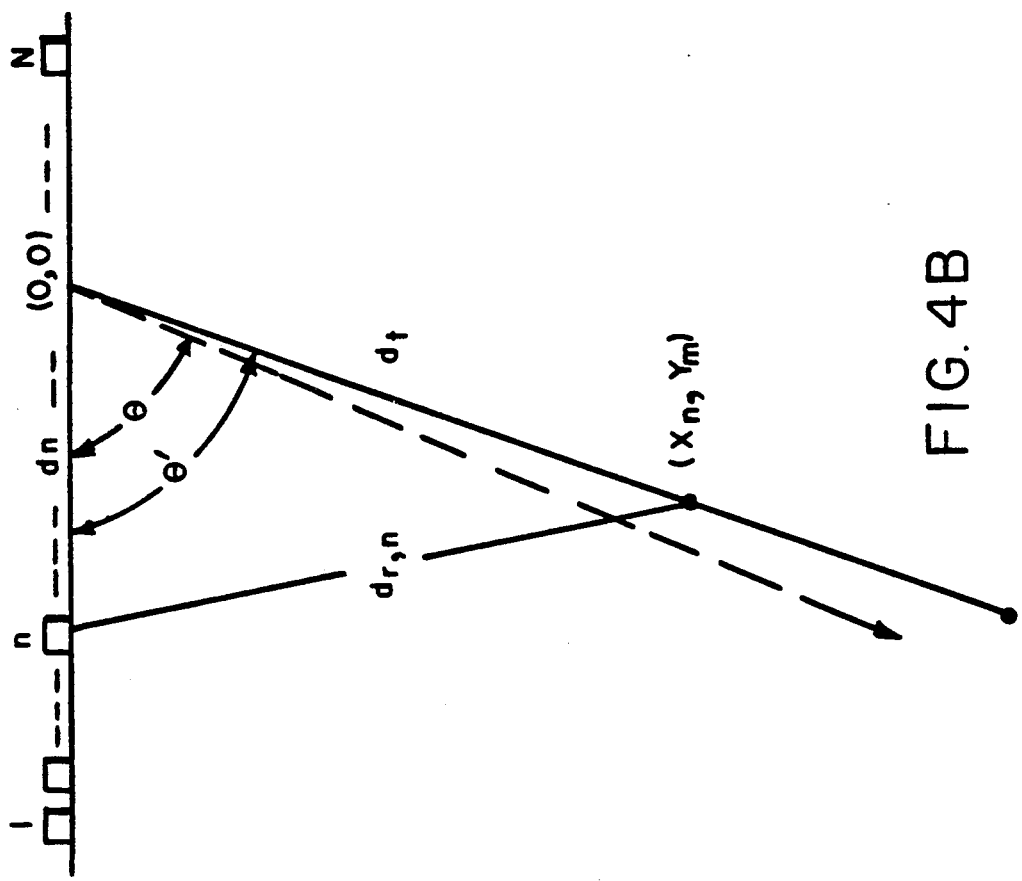
FIG. 4B is a further diagram illustrating scan operation and computation for the preferred embodiment of the invention.
Figure 4A:
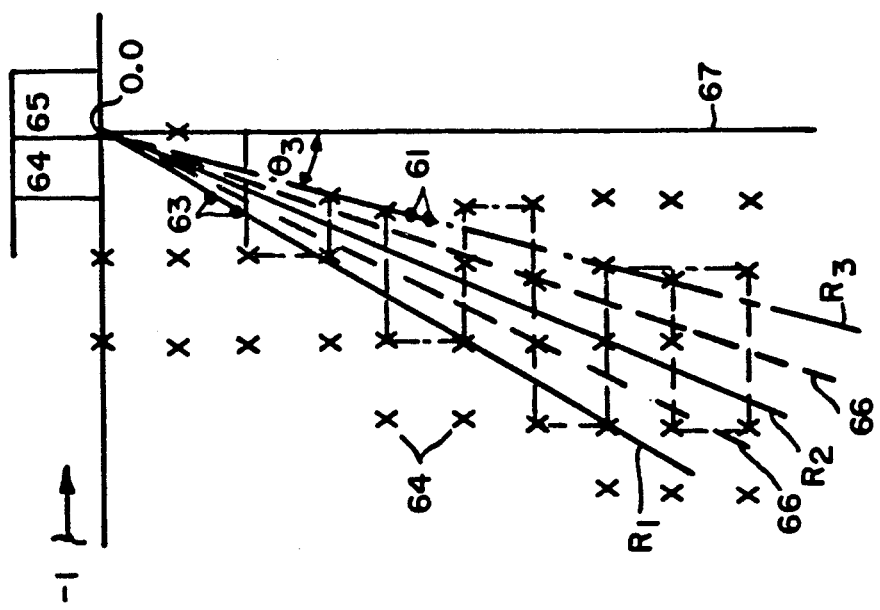
FIG. 4A is a diagram illustrating the scan operation for the preferred embodiment of the invention.

FIGS. 3A-3C are flow diagrams of the front end processing function for a preferred embodiment of the invention. Reference will also be made to FIGS. 4A and 4B which illustrate the operations being performed during a scan and are useful in understanding the flow diagrams.

Referring first to FIG. 4A, three illustrative scan lines $R_1$ $R_2$ and $R_3$ are shown, each of which projects at an angle $\theta_k$ to a center line 67 extending from a 0,0 origin point. For purposes of the following discussion, the original point will be considered to be the mid-point of the transducer array which, for the illustrative 128 transducer array is the point at the junction of transducers 64 and 65. The X's 64 in this figure represents the location of pixel points on display 48 for displaying a scanned image. In FIG. 4A, it is seen that some of the scan lines $R_k$ may pass through a pixel point 64 while other pixel points are not intersected by a scan line. For each scan line $R_k$, there are a plurality of points 63 at which samples may be taken. Again, there is no relationship for the preferred embodiment between the sample points 63 and the pixel points 64.

In accordance with the teachings of this embodiment of the invention, a wed $W_k$ is generated for each scan line $R_k$ which includes the area between lines at a distance $\Delta\theta/2$ on either side of the scan line, where $\Delta\theta$ is the angle between successive scan lines $R_k$. Thus, the width of each wedge is equal to $\Delta\theta$. The area within the dotted lines 66 in FIG. 4A is the wedge-shaped area $W_2$ for scan line $R_2$. As will be discussed in greater detail later, during a given scan, scan conversion is done for the pixels 64 which are within the given wedge-shaped section.

Referring to FIG. 3A, the operations involved in writing information into one port of the N channel dual memory buffer (DMB) 45 for one channel of the buffer are illustrated. The first step in this operation, step 110, is to initialize the system for a write cycle. The first step in this operation is to set $\theta$ to a $\theta$ original angle, to set the sample count to 0 and to set the memory being written into in DMB 45 to memory 0. $\theta$ original would typically be one of the end lines of the scan, for example, the $-45°$ line.

When step 110 has been completed, the operation proceeds to step 112 to determine if a scan line has been generated. This is primarily a synchronization step to assure that the write operations for all N channels begin in sync with the transmit timing. If a scan line has not been generated, step 112 is repeated until a "YES" output is obtained.

When a "YES" output is obtained during step 112, the operation proceeds to step 114 to sample the channel. This would involve obtaining a sample for sample point n from the transducer for channel N. During step 116, the sample taken during step 114 is stored in the sample n position for channel N of the DMB. At the same time, the sample for point n for each other channel is also being stored in the n position of the appropriate channel in the N channel DMB.

Once step 116 has been completed, the operation proceeds to step 118 to increment the sample count, and during step 120 a determination is made as to whether the current sample count is greater than the maximum sample count ($m_{max}$). If the sample count is not greater than $m_{max}$, the operation returns to step 114 to take a complex sample at the new sample point, to store the sample and to again increment the sample count. This sequence of operations is repeated with successive samples being taken and stored, until during step 120 it is determined that the maximum sample count has been exceeded.

When a "YES" output is obtained during step 120, the operation advances to step 122 during which the $\theta$ value is advanced to $\theta+\Delta\theta$ and the sample count is reset to 0. This sets up the conditions necessary to begin sampling for the next scan line. From step 122, the operation proceeds to step 124 to determine if the new $\theta$ angle is greater than the $\theta$end angle (for example, $+45°$). If it is determined that the $\theta$end angle has been exceeded, the operation proceeds to step 126 to reset $\theta$ to the original $\theta$ angle, thus restoring the system to its initial condition to begin a new scan cycle.

Either from step 124 if a "NO" output is obtained or from step 126 if this step is performed, the operation proceeds to step 128 to toggle the DMB so that, for the next scan at the current $\theta$ angle, storing of samples during step 116 will be on the opposite port of the dual memory buffer 45 from the port on which samples were stored for the preceeding $\theta$ angle. Preferably, there are an even number of angle $\theta$'s so that storage for $\theta$ origin will always occur in a consistent port of the DMB. From step 128, the operation returns to step 112 to await the generation of the next scan line at the indicated $\theta$ angle so that samples at this $\theta$ angle may be stored.

Before the data written on the DMB can be used, front end processor 40 performs an operation on each channel's data to convert the real samples into complex samples. The manner in which this conversion takes place has previously been discussed. The DMB is selected to have room for the complex samples in order to store the data after processing.

FIG. 3B is a flow diagram illustrating the steps performed when complex samples are read out from the DMB 45 and utilized to perform beam forming and scan conversion. Most of FIG. 3B is for only a single channel, with only steps 142 and 144 being for all channels.

The first step in the read operation, step 130, is to initialize for the read cycle. This involves setting the memory or buffer count for DMB 45 to 1, and setting X and Y to their original values. In the illustrative example, the original values for both X and Y are 0, these values thus being set to the 0,0 position shown in FIGS. 4A and 4B. However, where display is to occur starting at another point, for example just above an organ (for example, the heart) of interest, X orig and Y orig could have other values.

Once the system has been initialized, the operation proceeds to step 132 to determine if a scan line has been generated. This step is performed for the same reasons step 112 was performed (FIG. 3A), namely, to synchronize the operation.

When a scan line is generated, all of the N channels would simultaneously proceed to step 134 to calculate certain values for the $X_i$ and $Y_j$ positions then being looked at. In particular, referring to FIG. 4B in conjunction with FIG. 3B, the values calculated are the value $d_t$ which is the distance from the origin point to the pixel position $X_i, Y_j$, the angle $\theta'$ at which the $d_t$ line extends from the origin and the distance $d_m$ from the channel transducer to the $X_i, Y_j$ pixel position.

A value required to determine the three indicated values during step 134 is the value $d_n$ which is the distance from the origin point to the center of the nth transducer. This is a fixed value which is known from the geometry of the transducer array. The distances to the point $X_i, Y_j$ can be determined from the numerical value of $X_i$ and $Y_j$ times the spacings, KX and KY, respectively, between grid lines in the X and Y dimension for the pixel display. For purposes of discussion, it will be assumed that these values are normalized to 1 so that $d_t$ may be calculated from $$d_t = \sqrt{X_i^2 + Y_j^2} \tag{1}$$

$\theta'$ may then be calculated from the relationship $$\theta' = \tan^{-1}(Y_j/X_i) \tag{2}$$

$d_m$ may calculated from the relationship $$d_m = \sqrt{d_n^2 + d_t^2 - 2d_n d_t \cos\theta'} \tag{3}$$

Preferably, a separate dedicated circuit would be provided for each channel to do the calculations of step 134.

Once step 134 has been completed, the operation proceeds to step 136 to compute the transit time T for an ultrasonic signal received from the pixel point $X_i, Y_j$ at transducer n. This time is a round trip time and is, therefore, determined by the equation $$T = (d_t + d_m)(1/vel) \tag{4}$$

where "vel" is the velocity at which sound propagates in the medium.

For an ultrasonic medical scanner, it is well-known by one skilled in the art that "vel" may be considered to be a constant 1540 m/sec. If desired, this value alternatively may be determined for a particular patient or for a particular portion of the patient's body being scanned. Again, step 136 would be performed for each of the N channels. Since $d_m$ would be different for each of the channels, the transit time T would also be different for each channel.

During step 138, the next step in the operation, the complex samples which were read and stored for the channel for times which straddle the time T determined during step 136 are read out from the appropriate side of memory 45 and, during step 140, these complex sample values are interpolated to determine a complex sample value at the time T. The sample values read out are complex samples and the interpolation is performed separately for real and imaginary values. The interpolated complex value determined during step 140 is the value for channel n for the pixel point $X_i, Y_j$. This value is applied to a summing circuit during step 142 where real and imaginary values are summed with the complex values determined for pixel $X_i, Y_j$ during step 140 for the other N channels. Step 142 is basically the beam forming step, the beam forming being performed for the pixel point so that scan conversion is being concurrently performed. The sum determined during step 144 is stored during step 144 in the pixel position for the $X_i, Y_j$ pixel in the unused half of frame buffer 46.

From step 140, the operation also proceeds to step 146 to determine if the end of the required processing for the particular scan line has been reached. As will be described in greater detail later, this occurs when all pixel points for the wedge $W_k$ surrounding the scan line $R_k$ at angle $\theta_k$ have been looked at and the beam forming/scan conversion operation for all pixel points within the wedge $W_k$ have been completed. One easy way to determine this is to select a maximum radius Rmax for the operation and to, as shown for step 146, terminate the operation for the given scan line when $d_t > $ Rmax. Thus, if a "YES" output is obtained during step 146, then the operation is ready to look for pixel points 64 within the wedge-shaped section $W_m$ formed around the next scan line. The operation thus proceeds to step 148 to toggle the DMB to its other side, to reset X and Y to their original values (i.e. $X_i = 0, Y_j = 0$) and to set $\theta$ equal to the $\theta$ value for the last Write cycle. The reason for the last step is that reading during this next Read cycle will occur for values stored during the preceding Write cycle. Once step 148 has been completed, the operation returns to step 132 to wait for the next scan line to be generated so that a synced read operation for the new θ line may be commenced.

If the end radius is not reached during step 146, the operation proceeds to step 150 to select a new pixel address. The procedure for selecting a new pixel address is illustrated in FIG. 3C, and is similar to the procedure for selecting pixel addresses for the wedge-shaped section between two scan lines in the before-mentioned U.S. Pat. No. 4,471,449. An alternative procedure for finding pixels within a wedge-shaped sector is taught in U.S. Pat. No. 4,896,283 to Barry F. Hunt. FIG. 3C illustrates a general procedure for performing this operation when there is a negative θ angle. A fully equivalent procedure would be followed for positive θ angles.

Prior to performing step 150, the select new pixel routine is initialized during an initialized step such as step 130 or step 148 so that Xi and Yj are both initially 0 and the direction in which X values are incremented is set in the direction of θ. For FIG. 3C, this is assumed to be the $-1$ direction. Thus, referring to FIG. 4A, X would initially be set to increment to the left for $\theta_k$ values such as $\theta_k$. For $\theta_k$ values on the other side of center line 67, the X direction would be set so as to initially increment to the right.

The objective of the routine shown in FIG. 3C is to locate all points within the wedge-shaped section $W_2$ of width $\Delta\theta$ with the scan line at the angle $\theta_2$ at its center. This is accomplished by starting with the 0,0 point and then scanning pixel points in a zigzag pattern to find pixel points within the wedge. Thus, from 0,0, X would be incremented and a test made to determine if the resulting point was within the wedge. If the point was outside the wedge, then Y would be incremented and the direction of X reversed. X is then incremented in the opposite direction along the new Y line and each successive point is tested to determine if it falls within the wedge. If the X value falls within the wedge, it is utilized, if it does not fall within the wedge, X is incremented again and a new test made. Since it is possible that no pixel on a given Y line may fall within the wedge, at least for early values of $Y_j$, it may also be necessary to test after incrementing X to see if the new value is on the opposite side of the wedge from the preceding value. Each time a pixel value looked at is either on the opposite side of the wedge from the preceding value or is outside the wedge where the preceding value is inside the wedge, the value of X is incremented one more time, the value of Y is incremented and the X direction is reversed to begin another scan across a new Y line. This process is repeated until the end of state count is reached, or in other words until the end of the highest Y line of interest is reached.

Referring to FIG. 3C, these operations are accomplished by initially incrementing $X_i$ from its previous value, step 152. From step 152, the operation proceeds to step 154 to determine the θ' angle for the new point $X_i, Y_j$ being looked at (step 154). The angle θ' is equal to $\tan^{-1}(Y_j/X_i)$.

Once θ has been determined, the operation proceeds through steps 156–170 to determine the relationship of the angle θ to the wedge being looked at and to take certain actions based on this determination. As previously indicated, the wedge of interest for the angle $\theta_k$ is bounded on one side by a line at the angle $(\theta_k - \Delta\theta/2)$ and is bounded on the other side by a line at the angle $(\theta_k + \Delta\theta/2)$. Thus, during step 156, a determination is made (a) if the direction is the direction, and (b) if θ' is greater than the left hand wedge boundary line $(\theta_k - \Delta\theta/2)$. If this condition is true, referring to FIG. 4A, it means that the pixel being looked at is to the left of the left-hand one of the lines 66 with incrementing of X values being to the left. Thus, the point being looked at is outside of the wedge $W_k$ of interest and further incrementing of X in the minus direction will also yield points outside of the wedge. Thus, the operation proceeds to step 158 under these conditions to change the direction of the scan, in this case changing the direction to the $+1$ direction, and to increment the value of $Y_j$ to $Y_j + 1$.

When step 158 has been completed, the operation returns to step 154 to compute the θ' value for the new pixel point. From step 154, the operation then proceeds again to step 156. Assuming this time that a negative output is obtained during step 156, as would be the case if step 158 had been performed, causing the direction to now be the $+1$ direction, the operation would proceed to step 160. During step 160, a determination is made as to whether the direction is the positive direction and whether θ' is still less than or to the left of the left-hand boundary of the edge $W_k$. Assuming that the new point is still outside of the wedge, the operation proceeds to step 162 to increment X in the appropriate direction, in this case the plus direction, so that $X_i$ becomes $X_i + 1$.

From step 162, the operation returns to step 154 to determine the θ' angle for the newly selected pixel point and then proceeds to step 156. Under the previous assumption where the operation is in the plus direction, a no output would be obtained during step 156, causing the operation to proceed to step 160. Assume now that θ' is not less than the angle for the left-hand boundary of the wedge so that a "no" output is also obtained during step 160. This causes the operation to proceed to step 164 during which a determine is made as to whether the direction is the $-1$ direction and whether the θ' angle is equal to or greater than the angle $(\theta_k + \Delta\theta/2)$, which angle is the right-hand boundary of the wedge $W_k$. Since under the assumptions being made, the direction is in the $+1$ direction at this time, a "no" output would be obtained during step 164. However, if a "yes" output were obtained during step 164, it would mean that the search was proceeding to the left along the given Y line and was currently outside of the wedge and on the right side thereof. Therefore, to get into the wedge, the proper procedure would be to increment X by 1 in the negative direction as indicated by step 166.

Since a no output was obtained during step 164, the operation proceeds to step 168 to determine if the scan is proceeding in the positive direction (i.e., from left to right as viewed in FIG. 4A) and the angle θ' is greater or equal to $\theta_k + \Delta\theta/2$. If this occurs, it means that the scan is proceeding to the right and that the point being looked at is outside the right boundary of the wedge $W_k$. If a "yes" output is obtained during this step under the conditions previously discussed, it means that there is no point or pixel 64 within wedge $W_k$ for the given Y line $Y_j$. This might occur for a $Y_j$ line close to the origin, for example, line $Y_1$, but should not otherwise occur. In any event, when a "yes" output is obtained during step 168, it means that the scan must advance to the next Y line and the direction of scan changed. This is accomplished during step 170 which causes the direction of scan to be changed, causes $X_i$ to be incremented by 1 in the proper direction (incremented by 1 in the new direction), and $Y_j$ to also be incremented by 1.

If a "no" output is obtained during step 168, it means that "no" outputs have been obtained during steps 156, 160, 164 and 168. Under this condition, the point being looked at is determined to be within the wedge $W_k$. The operation thus proceeds to step 172 to generate an indication that the value $X_i$, $Y_j$ is a valid pixel value which may be utilized during step 134 (FIG. 3B) to perform beam formation and scan conversion in the manner previously described. From step 172, the operation proceeds to step 174 to increment the X value in the direction currently being scanned and the operation then returns to step 154 in preparation for the next time step 150 is to be performed.

Since the pixel points 64 are displaced from the scan lines by some $\theta$ angle, and since the received signal is optimum for the $\theta$ angle and drops off slightly for points off this angle, some gain correction may be required to compensate for the detected points being off angle based on $\theta'$ and $d_t$.

Figure 5:
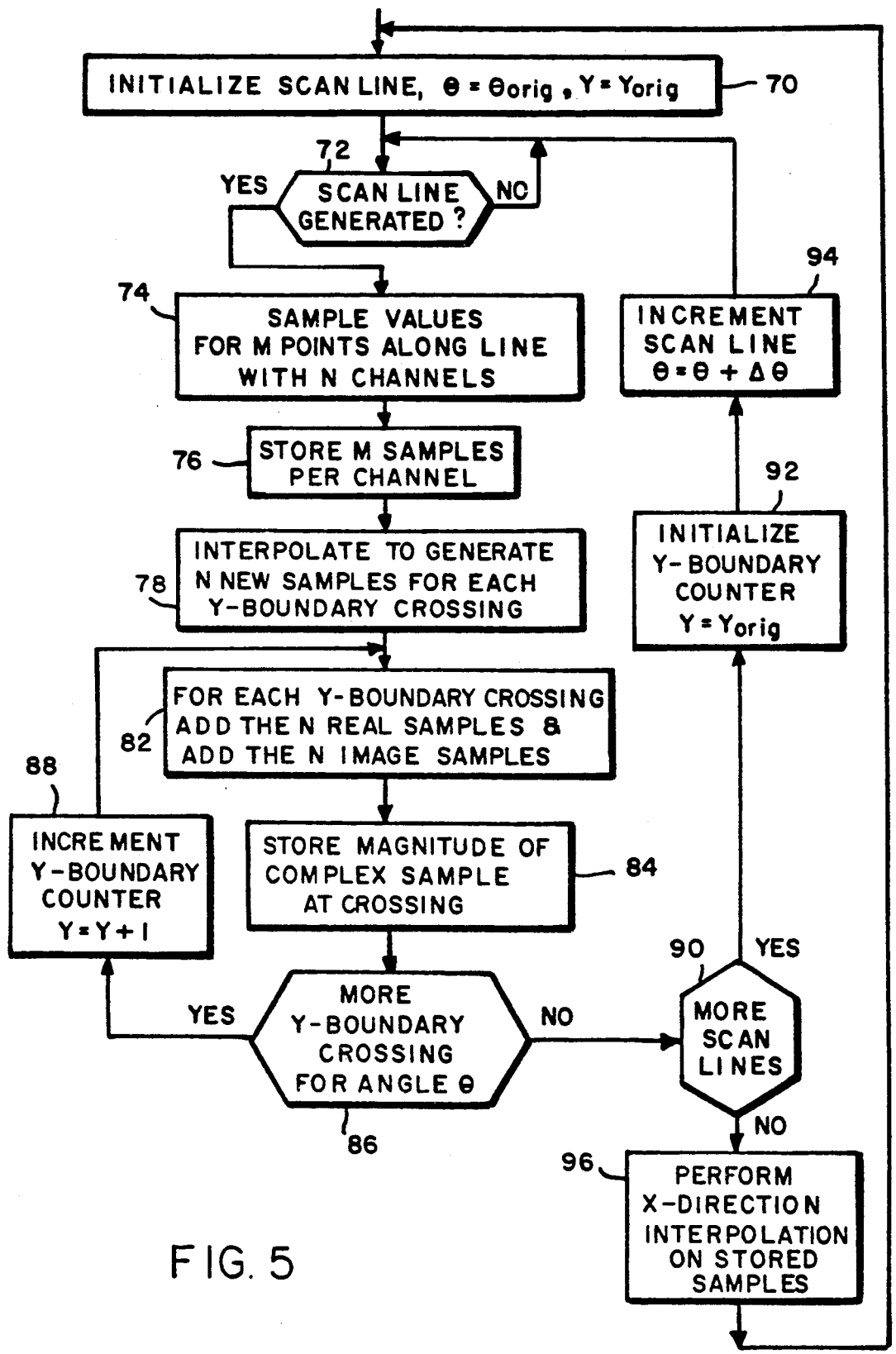
FIG. 5 is a flow diagram for performing beam formation/scan conversion for an alternative embodiment of the invention.
Figure 6:
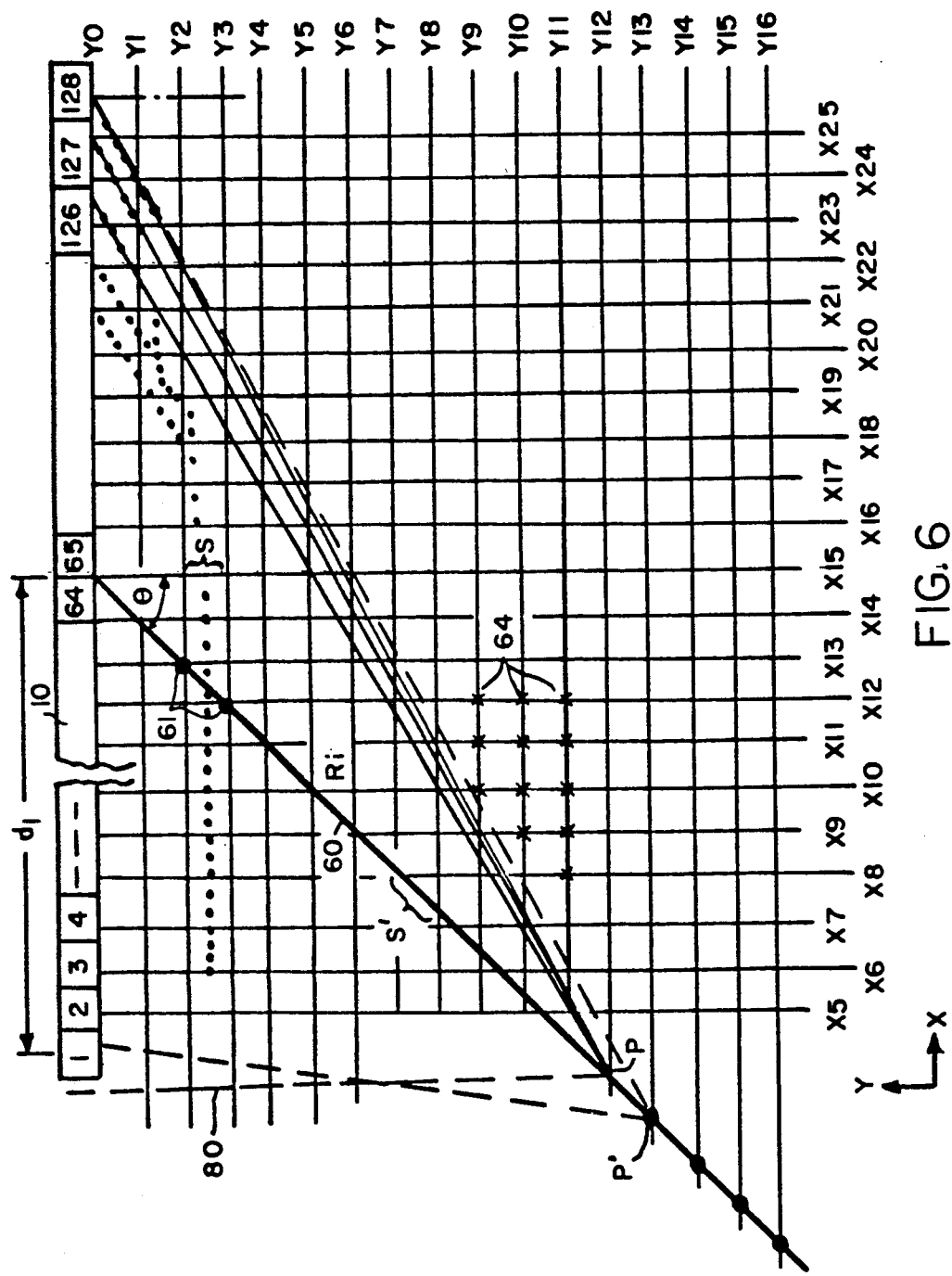
FIG. 6 is a diagram illustrating the scan operation and computation for the alternative embodiments of the invention.

FIG. 5 is a flow diagram of the operation for an alternative embodiment of the invention. Reference will also be made to FIG. 6, which illustrates the operations being performed during a scan and is useful in understanding the flow diagram of FIG. 5. Referring first to FIG. 6 the transducer head 10 is shown as having 128 elements, with all 128 elements being utilized in the scan aperture. Thus, there are 128 channels N in the system. The scan direction is indicated by the line 60 projecting at an angle $\theta$ from the center of the array 10. The points of interest are the points 61 where the line 60 crosses a Y boundary of the X-Y matrix grid on which the scan line 60 is to be displayed. A pixel 64 of the display appears at the junction of each Y line of the grid with each X line. However, while the points of interest for line 60 are the points 61 at which Y-crossings occur, sampling for the line 60 normally occurs at a much higher rate and normally at points 63 other than Y-boundary crossing points 61.

Assume initially that, for a given sample, all of the transducer elements are focused to the point P along line 60. Because of the location of point P, it is seen that the path to this point from element number 1 is shortest, and that the length of the path increases for successive transducer elements, being longest for element 128. Thus, assuming that echoes from the point P travel at a uniform rate to all of the transducer elements, an assumption which is generally valid so long as all of the beams are passing through substantially the same medium, the echo signal from the point P will arrive earliest at transducer number 1 and will arrive at successively later intervals at the succeeding transducer elements, arriving last at transducer element 128. However, if the point P is closer in along line 60, the beam would arrive earliest at some intermediate transducer element, with the duration increasing for transducer elements on either side of such element. The time of arrival pattern along a scan line having an angle $\theta$ other than the angle $\theta$ shown for the line 60 would also have different arrival time patterns from those for the line 60. Since it is necessary to sum the echo signals arriving at all 128 transducer elements for the point P to determine the value for this point, beam forming is required to compensate for the varying times of arrival of the echoes from the point.

Referring again to FIG. 5, the first step in this operation, step 70, is to initialize scan line and depth. Thus, $\theta$ is set to an original $\theta$ angle, for example the $\theta$ angle for the left most scan line which might typically be $-45°$, and depth is set for some Y-origin value. Y-origin is limited by the close in resolution of the transducer, but is normally determined by the depth of the organ or other item of interest for the scan. For example, if a scan of the heart is desired, Y-origin could be set so the sampling begins at a depth just above where the heart is located.

Once step 70 has been completed, the operation proceeds to step 72 to determine if a scan line, for example the scan line 60, has been generated. Assuming the scan aperture includes all of the transducer elements, all 128 elements would be energized to generate the scan line. If a scan line has not been generated, nothing further happens until a scan line is generated.

When a scan line is generated, the operation proceeds to step 74 to sample values for echo signals received at each of the transducer elements, with M evenly spaced samples being taken along each of the lines.

As is illustrated in FIG. 4, the transducer elements are steered at angle $\theta$ and focussed at some desired target depth along $\theta$, for example, point P along the line 60 at the desired angle $\theta$. The beams for transmission purposes can be focused to any point along the line 60, and would normally be focused to a point at the center of the area of interest. This results in maximum energy being received by the transducer elements for points along the desired scan line in the area of interest. The transmit focus and receive beam forming operations assure that the echoes which are utilized are, in fact, primarily along the desired scan line.

The M samples times N elements (for a total of MXN samples) which are taken for the $\theta$ scan direction are then stored in N channel dual memory buffer 45 during step 76.

Before the data can be used, the front end processor performs an operation on each of the N channels data to convert the real samples into complex samples. The manner in which this conversion takes place has previously been discussed. The memory 45 must have room for the complex samples in order to store the data after processing.

During step 78, the next step in the operation, processor 40 interpolates the stored values to obtain values for each channel (transducer) at each Y-boundary crossing of a scan line (i.e., the value for a line at the point where the line intersects a Y-boundary line). It is during this interpolation step that the beam forming operation is started. For example, for the scan line received at transducer number 3, the crossing with the Y3 grid line might occur between samples 10 and 11. By the same token, the crossing with the Y3 grid line for signals received at transducer 128 might, for example, be between samples 23 and 24.

The appropriate samples for each channel for each Y-crossing to be utilized for performing the interpolation may be determined in a number of ways using known dimensions and standard geometry formulas. One way is to draw a line 80 from the point P perpendicular to phased array 10 and to determine the length of this line to the array. The distance from the center of each transducer element to this line along the array direction can also easily be determined. These values then provide two legs of a right triangle from which the hypotenuse can be determined. Simple ratios can then provide the distance along this hypotenuse to each Y-boundary crossing. This distance, divided by the sample density (samples/distance) provides the sample numbers or times to be utilized for interpolation purposes.

Thus, if for a given Y-boundary crossing on a given line, it is determined that the Y-boundary crossing was at sample 10.4, the sample value at the Y-boundary crossing would be equal to the value of sample 10 +0.4 of the difference between samples 10 and 11.

Step 78 is initially performed for the first point 61 of interest along line 60 and is then repeated for successive points 61 along line 60 until interpolation has bee performed for all the points 61 of interest along this line for all channels on a particular scan direction with the results stored in working memory 44.

Thus, while for purposes of generating the ultrasonic signal, the beam is steered and focussed at some predetermined point along angle $\theta$ (i.e. point P along the line 60), the received signal is processed in a manner so as to be focused at each successive point 61 along the line 60 which is of interest. For example, the line lengths and angles for the point P' are different than those for the point P, meaning that different samples would be utilized for interpolating the Y crossings for the received echo signals for point P' than were used for determining the Y crossings for the point P. This is the equivalent of modifying the delays for an analog delay line as the depth of scan increases. However, unlike a tapped delay line, digital compensation can be continuous to any desired degree of accuracy.

At this point it should be noted that, as mentioned earlier, there are at least two samples for each point, a real sample and an imaginary sample. During the interpolation operation, the real values and imaginary values are separately interpolated so that real and imaginary values are obtained for each Y-crossing.

During step 82, the next step in beam formation, for each Y-boundary crossing (i.e., for each Y-boundary line Y0-YP, where P is the total number of lines Y) the N real samples determined and stored during step 78 for that Y-boundary crossing and the N imaginary samples determined during step 78 for the boundary crossing are separately added together. This sums the contributions from each of the N elements of the array in a phase coherent manner. The computed real and imaginary values are then stored during step 84 as the magnitude of the complex sample at the crossing in the dual frame buffer 46.

During step 86, a determination is made as to whether there are more Y-boundary crossings. If there are, the operation returns to step 88 to increment the Y boundary counter to a value Y=Y+1, and the operation returns to step 82 to add real and imaginary Y-boundary crossing samples for the new Y-boundary crossing to determine the magnitude of the complex sample at such crossing.

When during step 86 it is determined that all Y-boundary crossings of interest have been computed for the given scan line, the operation proceeds to step 90 to determine if there are more scan lines of interest. If there are more scan lines of interest, then the operation proceeds to step 92 to initialize the Y-boundary counter to Y=Y origin and to step 94 to increment the scan line by a desired $\Delta\theta$ angle, $\theta = \theta + \Delta\theta$. Since the $\theta$ shown in FIG. 4 is a minus angle, for example $-45°$, assuming a $\Delta\theta$ of $\frac{3}{4}°$, the new $\theta$ would be $-44.25°$. From step 94, the operation returns to step 72 to await the generation of the scan line at the new angle. When the scan line at the new angle is generated, sampling is performed during step 74. The samples are stored during step 76. The stored samples are interpolated during step 78 to obtain Y-boundary crossings, and the Y boundary crossings are added and stored as a magnitude of a complex sample at the crossing during steps 82 and 84, all in the manner previously described. These operations are repeated as a result of steps 86 and 88 until operations on the new scan line are completed. The entire operation is then repeated for successive scan lines until, during step 90, a determination is made that all scan lines for a given scan have been processed.

When a "NO" output is obtained during step 90, the operation proceeds to step 96 to perform X interpolation on the stored samples as the output display is raster scanned. This is a fairly straightforward operation which can be performed, for example, in the manner described in the two previously mentioned patents of the assignee. In particular, the Y-boundary values along a given Y line which are on either side of each X-boundary line are determined, and these values are then interpolated to determine the sample value at the junction or pixel point 64. This X-interpolation compensates for over sampling in the X direction which occurs at shallow depths and under sampling in the X direction which occurs at greater depths, this under- and over sampling being apparent from FIG. 2B. More particularly, there may be two or more Y-crossing sample values between adjacent X grid lines for the lower numbered Y-grid lines, while there may be two or more X-grid lines between successive Y-crossing values for the higher numbered Y-grid lines. In either event, the Y-crossing values which are on either side of the X-grid line are utilized for determining the sample value at the desired point 64.

While successive scan lines are writing into one side of the dual frame buffer with Y boundary beam formed results, the other side of the dual frame buffer is outputting the previous frame s data on a Y boundary basis for doing X-direction interpolation on the fly with the output display, 48, raster scan. On the completion of step 96, the operation returns to step 70 to initialize the system for a new scan cycle.

Figure 7:
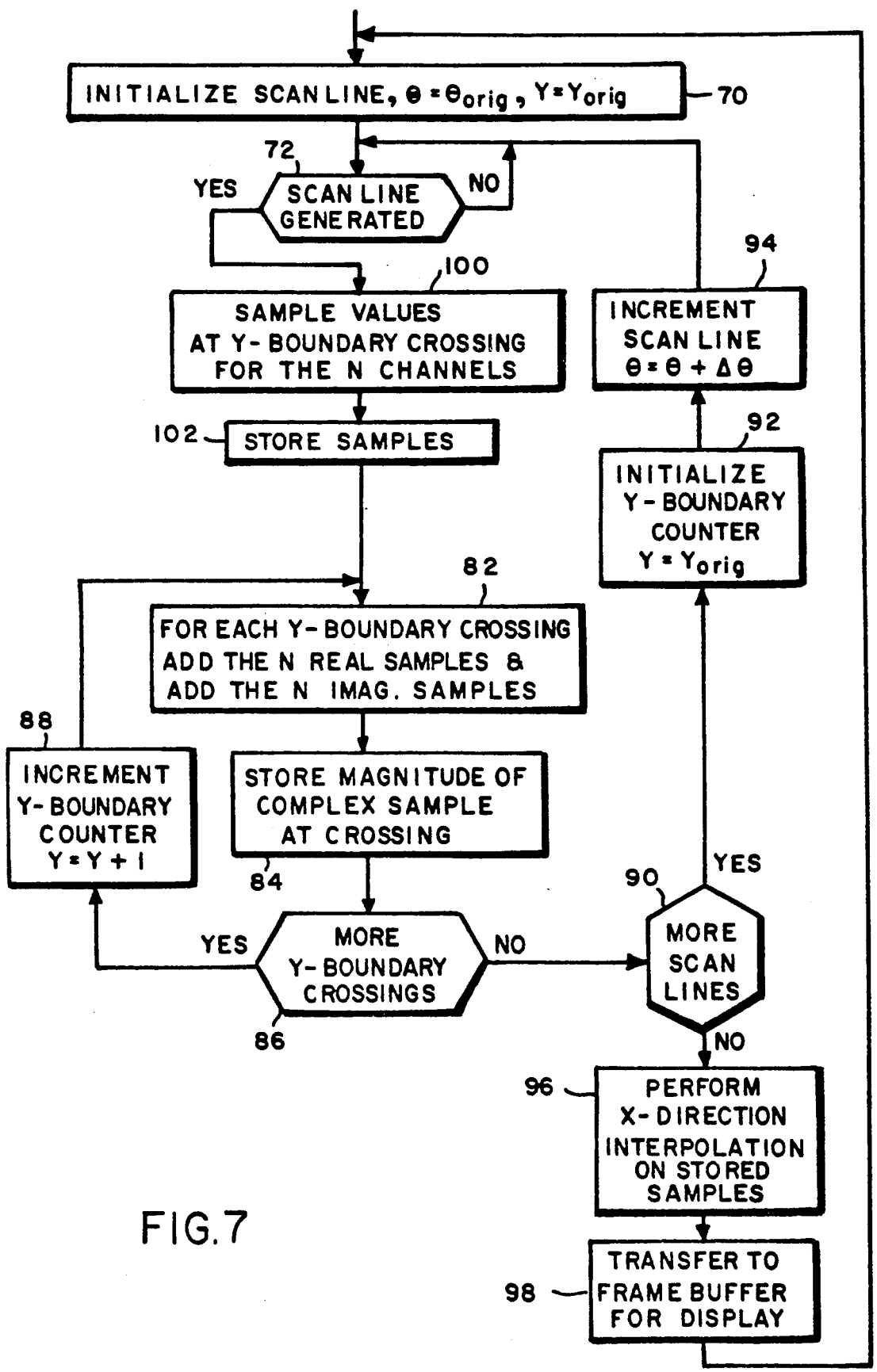
FIG. 7 is a flow diagram for performing beam formation/scan conversion for another alternative embodiment of the invention.

FIG. 7 is a flow diagram for an alternative embodiment of the invention wherein samples are initially taken at Y-boundary crossings, eliminating the need for the interpolation step 78. In FIG. 7, the same numbers have been used as in FIG. 5 for common steps. Thus, initialize step 70 is the same for the alternative embodiment as is step 72 which involves waiting for a scan line to be generated. However, in FIG. 7, once a scan line is generated, the operation proceeds to step 100. During this step, sampling control circuit 36 generates timing controls to A/D converters 14 such that sampling signals are generated for each channel at the points where such channel crosses a Y-boundary. Again, real and imaginary samples would be obtained at each point using one of the techniques mentioned earlier.

In order to implement this embodiment of the invention, it is necessary that a dedicated timing chip or the equivalent be provided for each of the N elements of array 10 which form part of the aperture. The timing signals for each element or channel would be based on the element number, the scan angle and the depth of the Y-boundary crossing for which the timing signal is being generated. In particular, for a given channel, the distance $r_{Ni}$ from the transducer element for the given channel to the point 61 where the scan line at the angle $\theta$ crosses a given Y-boundary line is given by the equation:

$$r_{Ni} = \sqrt{d_N^2 + R_i^2 - 2d_N R_i \sin\theta} \tag{5}$$

where
$d_N$ is the distance to the center of the transducer measured from the center of the array (see FIG. 6),
$R_i$ is the distance along line 60 to the point 61 at which the calculation is being made,
$\theta$ is the angle as shown in the figure.

The time at which the sample should be taken for a given channel and Y-crossing may be determined from the equation:

$$t_{Ni} = K(R_i + \sqrt{d_N^2 + R_i^2 - 2d_N R_i \sin\theta}) \tag{6}$$

where
$K = 1/$velocity of sound in medium through which beam is passing.

Assuming the apparatus is being utilized to scan the human body, K would be approximately equal to 1/velocity of sound in water.

The $t_{Ni}$ values calculated for each channel for each Y crossing point are utilized to clock the corresponding A/D converters 14. The resulting samples are then stored in N channel dual buffer memory 46 during step 102.

From step 102, the operation proceeds to step 82 to sum the real and imaginary samples a the Y-boundary crossing points, to step 84 to store in dual frame buffer 46 the magnitude of the complex sample at each crossing which results from step 82 and to step 86 to determine if there are more Y-boundary crossings. These steps are all performed in exactly the same manner as for FIG. 5. The remaining steps in the operation are also performed in the same manner previously described in conjunction with FIG. 5 to determine values for the intersections or pixel points 64.

The advantage of the approach described in conjunction with FIG. 7 is that it eliminates the need to interpolate data for Y-boundaries. It is also advantageous in that, with the embodiment of the invention shown in FIG. 5, the A/D converters are running at high speed, for example 20 mhz; however, only about 1/10 of the samples are used for purposes of display. For example, 400 samples are typically displayed along a 200 microsecond scan line yielding a 2 mhz display rate. Thus, the technique of FIG. 7 results in much lower speed requirements on the A/D converters, permitting lower cost converters to be used. Alternatively, analog signals from different channels may be multiplexed onto a single A/D converter, reducing the number of converters required by as much as a factor of 10. This may result in substantial cost savings.

However, this approach is disadvantageous in that parallel received lines could not be processed without a whole new bank of A/D converters and associated timing controls. In addition, each A/D converter is clocked in general at a different rate adding additional timing and control circuitry. The complexity of the clocking for this embodiment of the invention would normally mitigate against its use.

The embodiment of FIGS. 3A and 3B is thus the preferred embodiment because it offers simultaneous beam formation and scan conversion with the beam being formed at pixel locations in order to minimize scan artifacts. This embodiment of the invention is also relatively simple to implement, particularly compared to the embodiment of the invention shown in FIG. 7, and permits parallel beams to be formed straddling a main angle $\theta$ by just adding more calculating paths leading from the same dual memory buffer.

While the invention has been particularly shown and described above with reference to three embodiments, it is to be understood that these are merely illustrative of techniques which could be utilized to perform beam formation and scan conversion in a single (or near-single) operation using a digital front end, and that other techniques might also be utilized to accomplish the same function. For example, while for the embodiments of FIGS. 5 and 7 X-crossings have been determined during step 96 by interpolation, it is possible, with only a slight decrease in accuracy, to use the closest Y boundary crossing value as the pixel or junction value rather than interpolating to determine this value. Further, it is possible to start determining X-crossing values after Y-boundary crossings for two or more scan lines have been determined and to continue to determine X-boundary crossings as additional scan line Y-boundary crossings are determined, rather than doing the X-boundary determinations after all scan line Y-boundaries have been determined as for these embodiments. Similarly, the specific hardware shown and sequences of steps have also been provided primarily for purposes of illustration and other suitable hardware or sequences of steps could also be utilized to achieve the desired objective.

Thus, while the invention has been particularly shown and described above with reference to preferred embodiments, the foregoing and other changes in form and detail may be made therein by one skilled in the art without departing from the spirit and scope of the invention.

What is claimed is:

1. A digital front end for a phased array system which utilizes N channels of the array to generate successive scan lines at predetermined angles $\theta$, echoes received by channel elements being utilized to control a pixel matrix display, the front end comprising:
   means for sampling the echo signals from each of the N channels at selected points along the echo signals for each scan line;
   first means for utilizing the samples at the selected points to determine values for the N channels at points related in a predetermined way to pixel locations;
   means for summing the values for the N channels at each of said points to obtain a sample value for the point; and
   second means for utilizing the sample values for the points to store sample values for each pixel.

2. A front end as claimed in claim 1 wherein said pixels are located at the junctions of first and second grid boundaries;
   wherein said first means for utilizing stores values at crossings with the first of said grid boundaries;
   wherein said means for summing sums the values for the N channels at each first boundary crossing to obtain a sample value at the crossing; and
   wherein said second means for utilizing utilizes the sample values for the scan lines at the first set of boundary crossings to ootain values for the pixels at the junctions of the first and second boundaries.

3. A front end as claimed in claim 2 wherein said means for sampling samples the signal for each channel at M substantially uniformly spaced points along each signal; and
   wherein the first means for utilizing the samples includes means for interpolating at least the two samples closest on either side of each first boundary crossing for each channel to obtain the value for the boundary crossing for the channel, and means for storing the interpolated sample values.

4. A front end as claimed in claim 2 wherein said second means for utilizing includes means for interpolating the sample values at the first set of boundary crossings to obtain said pixel junction values.

5. A front end as claimed in claim 2 wherein said means for sampling samples at the first boundary crossings for each channel, said first means for utilizing storing the samples.

6. A front end as claimed in claim 1 wherein the means for sampling samples real and imaginary values, and wherein said means for summing sums separately for real and imaginary values.

7. A front end as claimed in claim 1 including means for selecting pixel points $p_m$ in a predetermined sequence for at least a given scan line;
   means for determining a transit time T for each channel for each selected point $p_m$;
   wherein the first means for utilizing includes means for utilizing samples for a channel at times straddling the time T to determine the sample for the corresponding point $p_m$ for the channel;
   wherein the means for summing sums the values for each point $p_m$ for the N channels; and
   wherein the second means for utilizing stores the summed output for each point $p_m$ as the value for the corresponding pixel.

8. A front end as claimed in claim 7 including a dual memory buffer (DMB) having N channels on each of its ports; and
   wherein the samples for each channel from said means for sampling for a scan line at an angle $\theta$ are stored in corresponding channels on one port of the DMB, the port of the DMB on which samples are stored being toggled for successive scan lines; and
   wherein the first means for utilizing utilizes samples from a preceding scan on one port of the DMB while new samples from the current scan at the angle $\theta$ are stored on the other port of the DMB.

9. A front end as claimed in claim 7 wherein said means for determining transit time includes means for determining for each channel N the time $d_t$ for means for determining for each channel the time $d_m$ for a reflection from the point $p_m$ to reach the element for the channel, and means for utilizing $d_t$ and $d_m$ to determine transit time T in accordance with the relationship $T=(d_t+d_m)(1/vel)$, where vel is the velocity at which sound propagates for the scan.

10. A front end as claimed in claim 7 wherein said means for selecting pixel points includes means for establishing a wedge shaped section for each scan line, the section extending between lines at angles $\theta \pm (\Delta\theta/2)$ where $\theta$ is the angle of the scan line and $\Delta\theta$ is the spacing between adjacent scan lines, and means for selecting pixel points within said wedge-shaped section in a predetermined pattern when samples for the scan line are being utilized.

11. A digital front end for a phased array system which utilizes N channels of the array to generate successive scan lines at predetermined angles $\theta$, echoes received by channel elements being utilized to control a pixel matrix display, the front end comprising:
   means for sampling the echo signals from each of the N channels at selected points along the echo signals for each scan line;
   means for utilizing the sample values to determine a value for each channel for each pixel utilized in the display; and
   means for summing the values for each pixel from the N channels to obtain the value for the pixel.

12. A front end as claimed in claim 11 wherein the means for utilizing includes means for determining a transit time T for each channel for each pixel $p_m$, and means for utilizing samples for a channel at times straddling the time T to determine the sample for the corresponding pixel $p_m$ for the channel.

13. A method for utilizing a digital front end of an N channel phased array system, which system generates successive scan lines at predetermined angles $\theta$ and controls a pixel matrix display, to perform substantially simultaneous beam forming and scan conversion, the method comprising the steps of:
   (a) sampling echo signals received from transducer elements for each of the N channels at selected points along the echo signals for each scan line;
   (b) utilizing the samples at the selected points to store values for the N channels at points related in a predetermined way to pixel locations;
   (c) summing the values for the N channels at each of said points to obtain a sample value for the point; and
   (d) utilizing the sample values for the points to store sample values for each pixel.

14. A method as claimed in claim 13 wherein said pixels are located at the junctions of first and second gird boundaries;
   wherein step (b) stores values at crossings with the first of said grid boundaries;
   wherein step (c) sums the values for the N channels at each first boundary crossing to obtain a sample value at the crossing; and
   wherein step (d) utilizes the sample values for the scan lines at the first set of boundary crossings to obtain values for the pixels at the junctions of the first and second boundaries.

15. A method as claimed in claim 14 wherein step (a) samples the signal for each channel at M substantially uniformly spaced points along each signal; and
   wherein step (b) includes the steps of interpolating at least the two samples closest on either side of each first boundary crossing for each channel to obtain the value for the boundary crossing for the channel, and storing the interpolated sample values.

16. A method as claimed in claim 14 wherein step (d) includes the step of interpolating the sample values at the first set of boundary crossings to obtain said pixel junction values.

17. A method as claimed in claim 14 wherein step (a) samples at the first boundary crossings for each channel and step (b) stores the samples.

18. A method as claimed in claim 13 wherein step (a) samples real and imaginary values, and wherein step (c) sums separately for real and imaginary values.

19. A method as claimed in claim 13 including the steps of selecting pixel points $p_m$ in a predetermined sequence for at least a given scan line; and determining a transit time T for each channel for each selected point $p_m$; and wherein step (b) includes the step of utilizing samples for a channel at times straddling the time T to determine the sample for the corresponding point $p_m$ for the channel;

wherein step (c) sums the values for each point $p_m$ for the N channels; and wherein step (d) stores the summed output for each point $p_m$ as the value for the corresponding pixel.

20. A method as claimed in claim 19 including a dual memory buffer (DMB) having N channels on each of its ports; and wherein the samples for each channel from said sampling step for a scan line at an angle $\theta$ are stored in corresponding channels on one port of the DMB, the port of the DMB on which samples are stored being toggled for successive scan lines; and wherein step (b) utilizes samples from a preceding scan on one port of the DMB while new samples from the current scan at the angle $\theta$ are stored on the other port of the DMB.

21. A method as claimed in claim 19 wherein step (c) includes the steps of determining for each channel N the time $d_t$ for the scan line at angle $\theta$ to reach point $p_m$, determining for each channel the time $d_m$ for a reflection from the point $p_m$ to reach the element for the channel, and utilizing $d_t$ and $d_m$ to determine transit time T in accordance with the relationship $T = (d_t + d_m)(1/\text{vel})$, where vel is the velocity at which sound propagates for the scan.

22. A method as claimed in claim 19 wherein step (e) includes the steps of establishing a wedge shaped section for each scan line, the section extending between lines at angles $\theta \pm (\Delta\theta/2)$, where $\theta$ is the angle of the scan line and $\Delta\theta$ is the spacing between adjacent scan lines, and selecting pixel points within said wedge-shaped section in a predetermined pattern when samples for the scan line are being utilized.

23. A method for utilizing a digital front end of an N channel phased array system, which system generates successive scan lines at predetermined angles $\theta$ and controls a pixel matrix display, to perform substantially simultaneous beam forming and scan conversion, the method comprising the steps of:

(a) sampling the echo signals received from transducer elements for each of the N channels at selected points along the echo signals for each scan line;

(b) utilizing the sample values to determine a value for each channel for each pixel utilized in the display; and (c) summing the values for each pixel from the N channels to obtain the value for the pixel.

24. A method as claimed in claim 23 wherein step (b) includes the steps of determining a transit time T for each channel for each pixel $p_m$, and utilizing samples for a channel at times straddling the time T to determine the sample for the corresponding pixel for the channel.

* * * * *